Oct. 13, 1942.  G. B. PEEBLES  2,299,030
GASOLINE METER
Filed Feb. 12, 1940  4 Sheets-Sheet 1
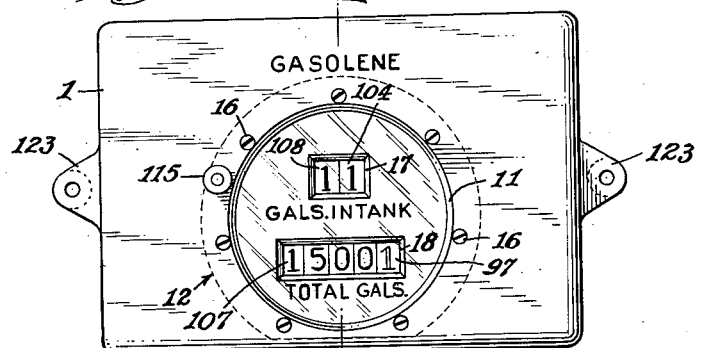
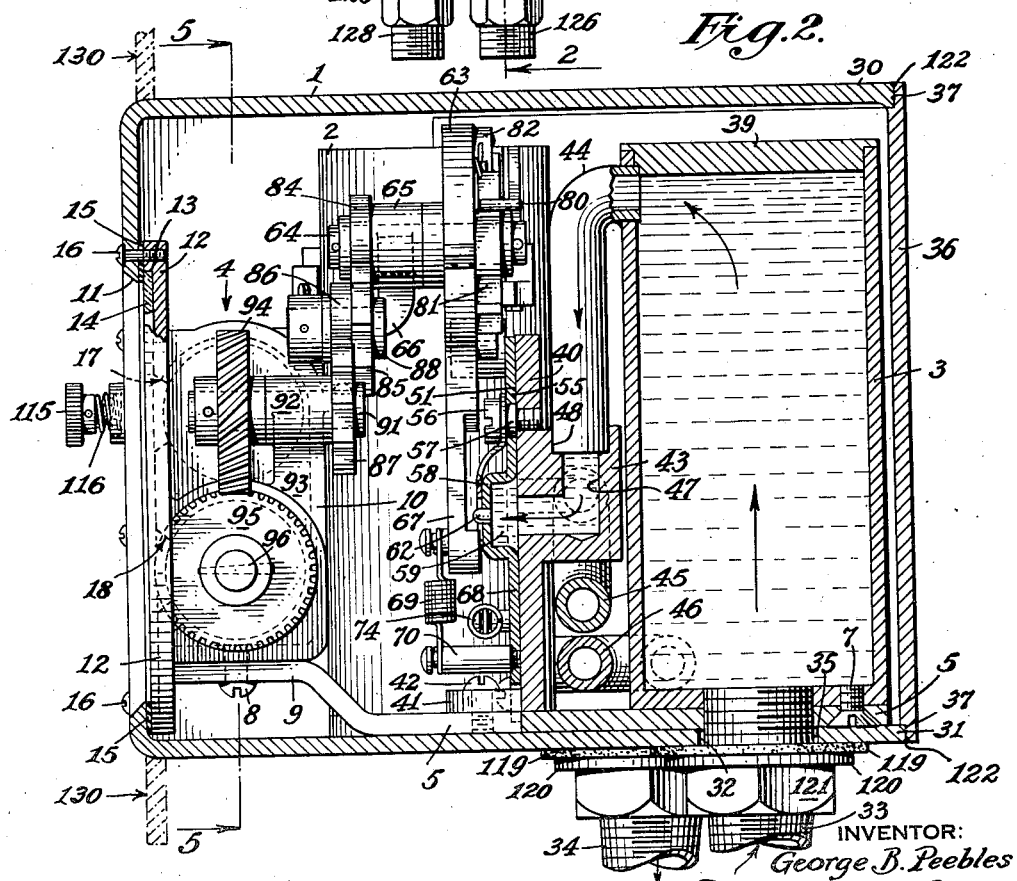
INVENTOR:
George B. Peebles
BY
Donald W. Robertson
his ATTORNEY Oct. 13, 1942.　　　G. B. PEEBLES　　　2,299,030
GASOLINE METER
Filed Feb. 12, 1940　　　4 Sheets-Sheet 2

INVENTOR:
George B. Peebles
BY
Donald W. Robertson
his ATTORNEY

Oct. 13, 1942.  G. B. PEEBLES  2,299,030
GASOLINE METER
Filed Feb. 12, 1940    4 Sheets-Sheet 3
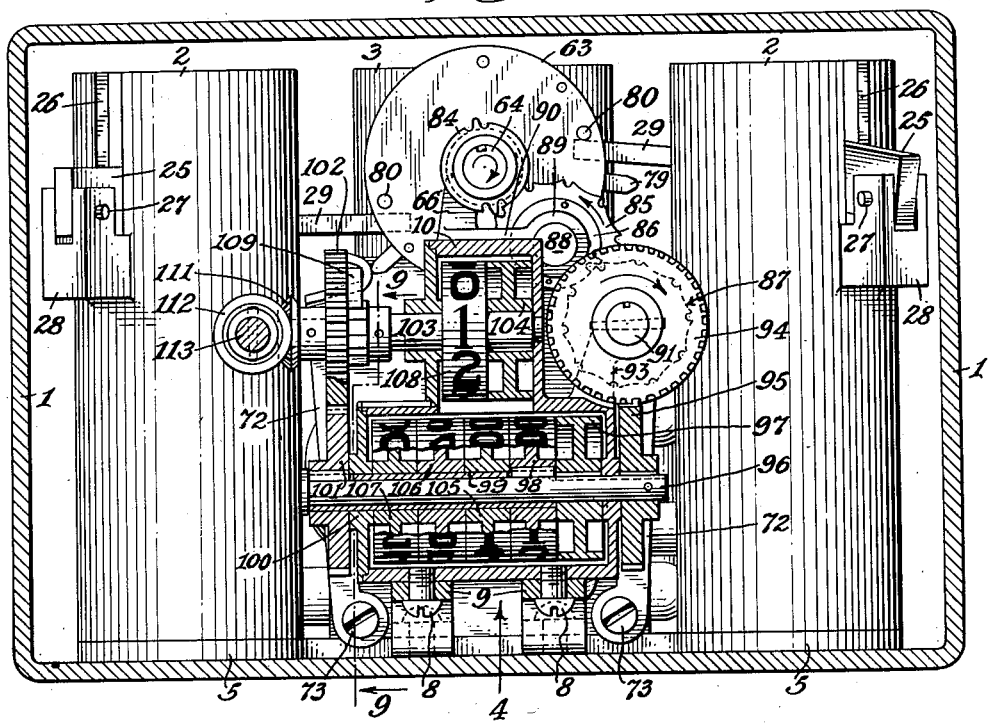
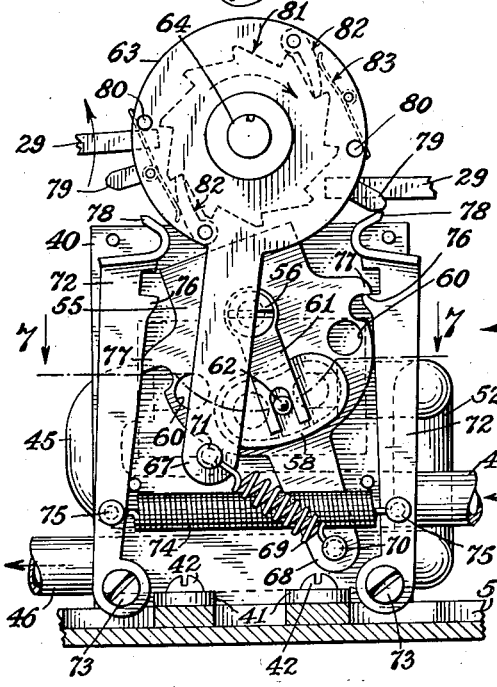
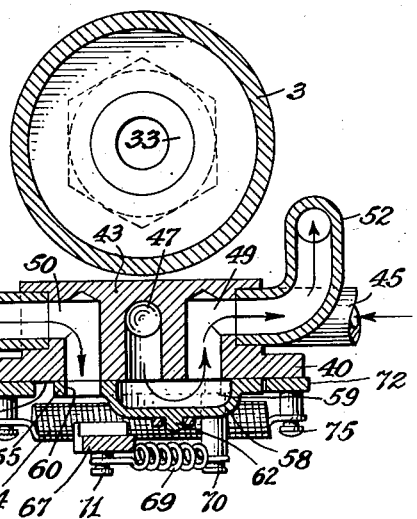
INVENTOR:
George B. Peebles
BY
Donald W. Robertson
his ATTORNEY.

Oct. 13, 1942.    G. B. PEEBLES    2,299,030
GASOLINE METER
Filed Feb. 12, 1940    4 Sheets—Sheet 4

INVENTOR:
George B. Peebles
BY
Donald W. Robertson
his ATTORNEY

Patented Oct. 13, 1942

2,299,030

UNITED STATES PATENT OFFICE 2,299,030

GASOLINE METER

George B. Peebles, Newark, N. J., assignor of one-third to Joseph W. Drake, New York, N. Y., and one-third to Juan M. Ceballos, Old Westbury, N. Y.

Application February 12, 1940, Serial No. 318,565

3 Claims. (Cl. 73—251)

The invention relates to fuel meters for automobile vehicles, and more particularly, to a combined gasoline meter and tank gauge for the instrument panel of automobiles or airplanes.

The ordinary types of gasoline gauges with which present day automobiles are equipped do not provide accurate readings of the amount of gasoline in the tank. They are intended only to give a rough approximation of the remaining fuel supply, as evidenced by the fact that many of the electric or fluid column gauges in common use are not even calibrated in gallons, but merely so as to indicate whether the tank is empty, one-quarter, one-half, or three-quarters full, or full. This makes it quite difficult to estimate the actual amount of gas in the tank, and also makes it inconvenient to obtain an accurate determination of the gas mileage, i. e. the number of miles which the car runs per gallon of gas consumed.

Heretofore, when accurate figures for gas mileage were to be calculated from readings of the ordinary tank gauge at the beginning and conclusion of a test period, it has been necessary to lengthen the test period so as to minimize the errors resulting from the inaccuracy of such readings. This has necessitated the keeping of a careful record of the gasoline added to the tank over a considerable period of time if reliable data concerning gas mileage was to be obtained.

The inadequacy of such a method for determining gas mileage having been recognized, it has been customary to employ special metering apparatus for use in road tests. Such apparatus usually consists of an auxiliary tank into which a carefully measured quantity of fuel is placed. The car is then driven until this auxiliary fuel supply is completely exhausted, the mileage reading being recorded at the beginning and at the conclusion of the run. The disadvantages of the use of auxiliary equipment are obvious, and it is one of the objects of the present invention to provide an improved gasoline gauge, for permanent installation in the vehicle, which will give accurate readings of the gas supply in the main tank and thereby eliminate the necessity of employing special test equipment for determining gas mileage.

Another object of my invention is to provide an improved fuel indicator for automotive vehicles comprising two measuring cylinders arranged within a container and communicating with the container through a selective valve, with pistons in the cylinders arranged for operation solely by the pressure of the fuel within the cylinders.

I am aware that it has been proposed heretofore to place a liquid flow meter in the gasoline supply line of automobiles in order to measure the quantity of fuel consumed. Such devices have not found ready acceptance in the automotive field, however. Meters for this purpose which employ a rapidly rotating metering wheel are subject to considerable wear which impairs their accuracy in time. Moreover, such devices do not operate altogether satisfactorily in gasoline feed lines, possibly because of the uneven, pulsating flow which may affect the accuracy of the measurements obtained. Accordingly, it is a further object of my invention to provide a liquid metering device which eliminates the necessity for a rotating metering wheel and which is not subject to the disadvantages of this type of meter.

A further object of my invention is to provide a combined gasoline meter and supply tank gauge which is of a compact and rugged design, and which is accurate in operation under pulsating flow conditions.

Other objects and advantages will appear as the description proceeds.

Referring to the drawings, wherein I have illustrated a preferred embodiment of the invention:

Figure 1 is a front elevational view of the complete instrument; and Figure 2 is an enlarged vertical transverse sectional view on the line 2—2 of Figure 1.

Figure 5 is a vertical sectional view taken on the line 5—5 of Figure 2 but with the inlet and outlet connections omitted as in the process of assembly.

Figure 6 is a detail view of the automatic valve mechanism; and Figure 7 is a horizontal sectional view taken on the line 7—7 of Figure 6.

In its general arrangement, my improved meter and gauge comprises a casing 1 in which are arranged a pair of displacement measuring cylinders 2, a reservoir or accumulator 3 from which the measuring cylinders 2 are filled alternately, a counter mechanism 4 (Figs. 2 and 5), an automatic valve mechanism (Figs. 6 and 7) for controlling the flow to and from the measuring cylinders 2 and which is actuated in accordance with the movement of pistons arranged in the measuring cylinders, and means for transmitting to the counter mechanism movements corresponding to, or proportional to, the measurements effected by the cylinders 2.

Figure 8:
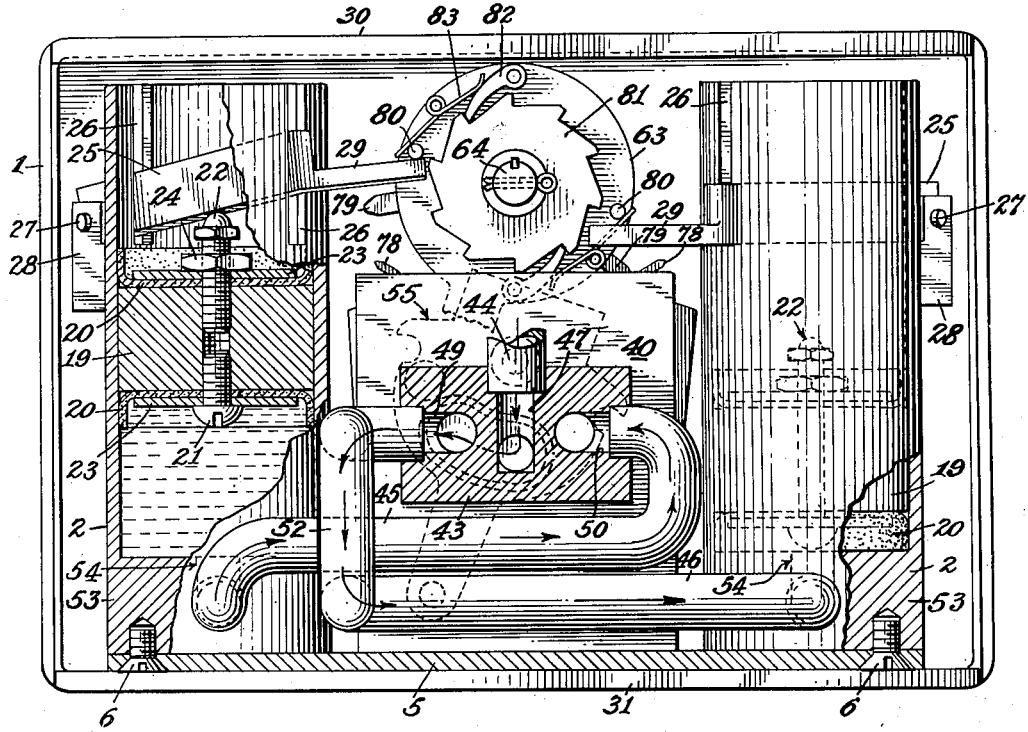
Figure 8 is a rear elevational view partly in section, the cover of the case and the inlet and outlet connections being omitted as during the process of assembly.

The cylinders 2 and 3 and the counter 4 are mounted on a base plate 5 as by means of screws 6, 7 and 8, the screws 6 and 7 which secure the cylinders 2 and 3 preferably being counter-sunk as shown in Figures 2 and 8. The base plate 5 may be offset or bent upwardly at its forward end to provide the flange 9, which is arranged to support the case 10 of the counter mechanism 4 in position to display the indicia of the counter wheels through an opening 11 in the front of the casing 1.

The counter casing 10 is formed with a mounting plate 12 at its forward side, this plate preferably being recessed as at 13 to receive a glass face 14. The plate 12 and glass face 14 are drawn up tightly against a gasket 15, which surrounds the opening 11 in the case 1, by means of screws 16 disposed around the periphery of the opening. Windows 17 and 18 are formed in the face plate 12 of the counter mechanism to display the indicia on the counter wheels.

Figure 4:
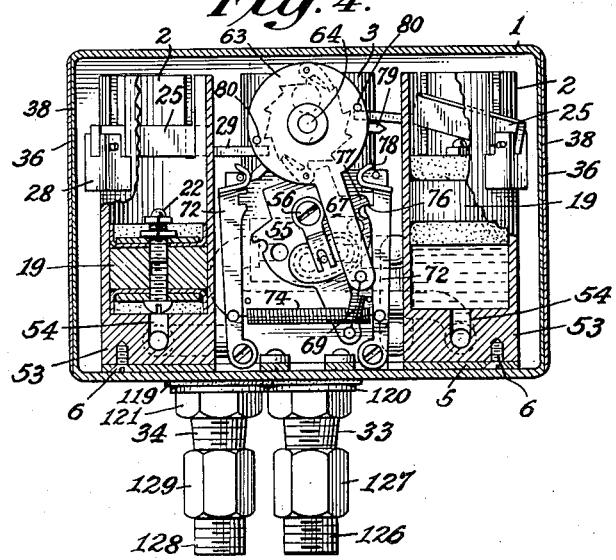
Figure 4 is a vertical sectional view taken on the line 4—4 of Figure 3.

Each of the measuring cylinders 2 is closed at the bottom but is left open at the top as will be seen in Figures 4 and 8. These cylinders may be formed in any desired manner as by machining, deep drawing or extruding operations performed on brass or aluminum. In each of the cylinders 2 there is arranged a freely floating piston 19 faced by a washer or pair of washers 20. These washers may consist of discs or cups of leather or other material suitable for effecting a liquid tight seal between the piston and the cylinder. These washers may be secured by means of screws 21 and 22 which are arranged to clamp the cups 20 between metal washers 23 and the ends of piston 19. The upper screw or bolt 22 preferably is made adjustable by providing a lock nut 24. As shown, the bolt 22 has a rounded or spherical head projecting above the wrench faces for engagement with the under side of a lever 25 extending across the top of the cylinder 2 and projecting through vertical slots 26 formed at opposite sides thereof. The lever 25 is pivotally mounted on the cylinder, as by means of a pin 27 by which it is secured to a bracket 28 formed on, or secured to, the cylinder. The inner end of the lever 25 is provided with a projecting arm 29 for actuating both the counter and valve mechanisms in a manner subsequently to be described.

Figure 3:
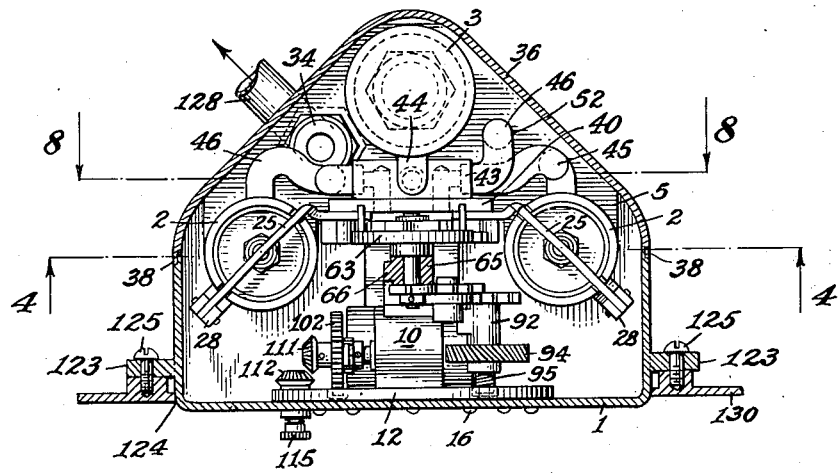
Figure 3 is a top plan view of the mechanism within the case of the instrument, showing the case in section and the manner in which it is mounted on the instrument panel of an automobile.

The casing 1, which is of rectangular box-like form, is provided with projecting top and bottom flanges 30 and 31 which, in the embodiment illustrated, are of approximately triangular form. The sides between these flanges are left open to permit ready insertion of the assembled operating mechanism from the back of the casing. The lower flange of the casing is provided with openings 32 for the inlet and outlet tubes 33 and 34. It will be observed that these openings are made sufficiently large to provide a clearance at 35 around the inlet and outlet tubes (see Fig. 2). This provides the requisite tolerance to allow for slight variations in the position of the operating assembly as determined by the attachment of the plate 12 to the forward wall of the casing by the screws 16, and also allows for variations in the thickness or degree of compression of the gasket 15. The casing is provided with a cover 36 which extends around the back thereof and closes the open sides between the flanges 30 and 31. The inner edges of the cover may be recessed, as at 37 to receive the edges of the flanges 30 and 31. Also, the edges of the side walls of the casing 1 and cover 36 may be recessed to provide an overlapping connection therebetween, as at 38 (Fig. 3), while providing a flush joint along the inner and outer surfaces of the casing and cover.

The accumulator cylinder 3 may be of a construction similar to that which has been described with reference to the measuring cylinders 2 except that its top end is sealed off with a cover 39 which may be soldered, brazed or welded thereto, in order to provide a suitable permanent liquid-tight connection. The cylinders 2 and 3 are interconnected, by means of suitable piping, through a valve block 40. The valve block 40 is vertically arranged between the cylinders 2 and 3, as shown best in Figures 3 and 4, and is mounted on the base plate 5 in any suitable manner, as by means of attaching lugs 41 and screws 42. The block 40 is provided with a projecting portion 43 to provide a convenient connection to a tube 44 leading from the accumulator cylinder 3, and to tubes 45 and 46 which provide connections to the lower ends of the measuring cylinders 2. The tubes 44, 45 and 46 may be connected to the respective cylinders and the block 40, in any suitable manner as by soldering or brazing. In the embodiment illustrated, the passage 47 in the projecting portion 43 of the valve block is counter-bored at 48 to receive the end of the tube 44. Similarly, the passages 49 and 50 in the valve block may be counter-bored to receive the ends of the tubes 45 and 46. The passages 47, 49 and 50 each has a right-angled bend as shown in Figs. 2 and 7, bringing them to the face 51 of the valve block, so that the inlet (or outlet) points of these passages lie adjacent one another, and preferably also so that they are arranged with their centers approximately along a circular arc as shown by the arcuate portion of the section line 7—7 in Figure 6. The purpose of this arrangement will appear as the description proceeds.

Referring particularly to Figure 8, it will be observed that the tubular conduit 45 is bent around in such a manner as to permit its connection to that side of the projecting portion 43 of the valve block which is farthest removed from the cylinder with which it is associated. The same thing is true with respect to the tubular conduit 46, the main portion of which, in order to provide a compact construction, lies below and parallel to the conduit 45 as shown in Figures 2 and 8. A double elbow construction permits the conduit 46 to loop around the conduit 45 as at 52. It is not essential, however, that the arrangement of these conduits be precisely as shown in the drawings although the construction just described provides a most compact arrangement which is desirable in order to provide an instrument which can be mounted behind the instrument panel of an automobile or airplane. The measuring cylinders 2 preferably have a double bottom or a deep bottom 53 having a passage 54 therein leading from the interior of the cylinder to the connection with the conduit 45 or 46 as the case may be. Thus, when the cylinder is empty the piston 19 will drop all the way to the bottom of the cylinder.

The valve mechanism

I shall now describe the automatic valve mechanism with particular reference to Figures 2, 5, 7 and 8 of the drawings. The purpose of this valve mechanism is to reverse the connections between the measuring cylinders so that they will be filled and discharged alternately, i. e., so that one of the cylinders will be in the process of filling up as the other is being discharged and vice versa. This means that during one stage of the operation, the connection between one of the measuring cylinders 2 and the accumulator cylinder 3 is open, permitting the liquid fuel to pass from the accumulator into this particular measuring cylinder; while at the same time the connection between the second measuring cylinder and the interior of the main body of the casing 1 is open so as to permit the measured quantity of fuel to flow from this second cylinder into the casing 1. It may be explained at this point that during the operation of my instrument the mechanism within the casing 1 is completely immersed in the gasoline which is being discharged from the measuring cylinders. During the next stage of the operation, the connections are reversed so that the second measuring cyinder is filling while the first one is discharging. The selective control mechanism which automatically reverses the connections between the cylinders is operated automatically by the movement of the pistons 19 in conjunction with the levers 25 previously described and other mechanism now to be described.

A valve plate 55 is pivotally secured to the valve block 40 as by means of a screw or bolt 56 which may be provided with a cylindrical bearing portion 57 for engagement with a circular opening in the valve plate. The valve plate 55 is provided with a central raised portion 58 in which is formed a passage 59 arranged to bring the passage 47 alternately into communication with the passage 49 and passage 50. Thus, in the position shown in Figures 6 and 7 the passage 47 is in communication with passage 49, permitting gasoline to be discharged from the accumulator cylinder 3 into the conduit 46, while the conduit 45 is open to the main body of the casing through one of the apertures 60 formed in the valve plate 55. In this position of the valve plate the left-hand cylinder 2 (as viewed in Figure 5) is being filled through the conduit 46, while the right-hand cylinder 2 is discharging through the conduit 45.

In order to insure a film engagement between the valve plate 55 and the face 51 of the valve block, I prefer to employ resilient means for urging the valve plate against the block. For this purpose I have shown a flat spring 61 which is secured in place under tension by means of the screw 56, the cylindrical portion of which passes through one end of this spring. The other end of the spring may be bifurcated, as shown, in order to provide a slidable engagement with a projection 62 formed on the portion 58 of the valve plate.

Movement of the valve plate 55 is controlled by a trip mechanism which shifts the position of the valve plate with a snap action that takes place just as the piston 19 of one of the measuring cylinders reaches the top of its stroke. The trip mechanism is actuated through the projecting arms 29 of the levers 25 through a rocking disc 63 mounted loosely on the shaft 64 carried in a boss 65 formed on a bracket 66 which may conveniently be mounted on the casing 10 of the counter mechanism 4. The rocking disc 63 has a projecting lever arm 67 which is resiliently connected to a projecting lever arm 68 formed on the valve plate 55 as by means of a tension spring 69 secured to pins 70 and 71 formed on or attached to the lever arms 68 and 67 respectively. A pair of trip levers 72 are pivotally secured to the base 5 of the mechanism as by means of screws 73. The upper ends of the levers 72 are urged resiliently toward each other by a tension spring 74, the ends of which are fastened to pins 75 arranged a suitable distance above the pivot point of these levers. Lugs 76 and 77 are formed respectively on the levers 72 and valve plate 55, so as to provide a releasable engagement which holds the valve plate 55 in one of its selective positions against the tension of the spring 69 under the action of the lever 67 until such time as the trip mechanism is actuated.

The upper end of each lever 72 has a projecting lug 78 arranged for engagement by one of a pair of lugs 79 carried by the rocking disc 63. The disc 63 is oscillated by the action of the projecting arms 29 of the levers 25 associated with the measuring cylinders, these arms 29 being arranged for engagement with pins 80 secured to the disc 63. Thus the levers 72 act as movable stops or holding means for the valve plate.

The action of the selective valve mechanism will now be described with particular reference to Figures 4 and 6. In Figure 4 the parts are shown in the positions which they occupy at the moment that the left-hand measuring cylinder begins to fill. The valve plate 55 has been tripped and lies in the position which provides a conection between the accumulator 3 and the left-hand cylinder 2; also providing a connection from the right-hand cylinder into the main body of the casing 1. Now, as the piston 19 begins to rise under the action of the gasoline entering from the accumulator 3 and pushing through into the left-hand cylinder 2, the piston reaches a position in which the bolt 22 engages the lever 25. Further movement of the piston lifts the lever 25 so that its projection 29 rocks the disc 63 through its engagement with the pin 80. This moves the lever 67 to the left, stressing the tension spring 69. However, this does not move the valve plate because the latter is held in its first position by the engagement of the lug 77 with the lug 76 of the right-hand trip lever 72. This action continues until the right-hand lug 79 of the disc 63 engages the end 78 of this lever 72. In Figure 6 the parts are shown in the position which they ocupy at the moment that this engagement takes place. At this time, the left-hand piston 19 has reached almost the very top of its stroke, and the further slight movement which it makes beyond this point brings about a camming action between the lugs 78 and 79 which pushes the right-hand lever 72 slightly to the right in a clockwise direction about its pivot, releasing the engagement of its lug 76 with the lug 77 of the valve plate 55. At the moment that this release takes place, the valve plate 55 is free to move in a clockwise direction about its pivot 57 under the action of the spring 69 which has been tensioned by the prior clockwise movement of the lever 67. This causes the valve plate to snap over into a position to reverse the connections between the measuring and accumulator cylinders. Also at this point in the cycle of operation, the right-hand cylinder 2 will have discharged its measured quantity of fuel into the main chamber so that it will now begin to fill up again from the accumulator cylinder, whereas the measured quantity of fuel in the left-hand cylinder 2 will begin to discharge through the passage 49 which is now aligned with the right-hand aperture 60 of the valve plate.

The action of the valve tripping mechanism in the opposite direction is just the same as has been described, so that as each cylinder is filled in turn, the valve plate snaps over to open its discharge and start filling the other cylinder, the valve plate snapping back and forth at the moment that the one cylinder or the other becomes filled (which is the same moment at which the other cylinder or the one becomes emptied).

*The counter mechanism*

Keyed to the shaft 64 is a ratchet wheel 81 (Figure 8) to which counter-clockwise motion is transmitted by pawls 82 mounted on the disc 63. Engagement of the ratchet teeth by the pawls 82 is insured by the springs 83. Referring to Figure 8, the lever arm extension 29 of the cylinder which appears at the right-hand in that view, will engage the pin 80 on the up stroke of the piston 19, rotating the disc 63 in a counter-clockwise direction and carrying with it the ratchet wheel 81. This is a working stroke. On the next stroke the extension 29 of the lever arm of the cylinder which appears at the left in this view rises, turning the disc 63 in a clockwise direction, causing the pawls to click backward over the teeth of the ratchet wheel. This is an idle stroke. Motion imparted to the shaft 64 on each working stroke is transmitted to a two-toothed pinion 84 keyed to the shaft. This pinion is the first element of an intermittent gear train comprising the two-toothed pinion 84, the intermittent gear 85 which has ten sections, the one-toothed pinion 86, and the intermittent gear 87 which has 10 sections. The gear 85 and pinion 86 are fastened together and rotate on a stub shaft 88 mounted in the boss 89 of a bracket 90 formed on or secured to the case 10 of the counter mechanism. The intermittent gear 87 is keyed to a shaft 91 mounted in a boss 92 formed on a bracket 93 fastened to the casing 10. To the other end of the shaft 91 is secured a spiral gear 94 meshing with a spiral gear 95 keyed to the shaft 96 of the counter.

In the embodiment illustrated, the first unit of the intermittent gear train is a decimal expression of thousandths of a gallon, the second unit a decimal expression of hundredths of a gallon, and the third unit a decimal expression of tenths of a gallon. In this connection, however, it will be observed that in view of the fact that the pinion 84 has two teeth, whereas the pinion 86 has one tooth, this compensates for the idle stroke of the pawls on the ratchet wheel 81. With this arrangement every five working strokes (which corresponds to 10 cylinder fillings) will produce 1/10 of a revolution of the gear 85 and each complete revolution of the gear 85 and pinion 86 will produce 1/10 of a revolution of the shafts 91 and 96. Thus, for every fifty working strokes the shaft 96 will make 1/10 of a revolution. Since fifty working strokes represents one hundred measuring cylinder fillings, it will be seen that with a cylinder capacity of 0.231 cubic inch or 1/1000 of a gallon, the counter shaft 96 will make one complete revolution for each gallon of fuel metered. Thus, a wheel 97 keyed directly to the shaft 96 and bearing numerals from 0 to 9, inclusive, will read directly in tenths of a gallon. It will be understood that the capacity of measuring cylinders 2, and the ratio of the gear reduction unit are subject to modification in accordance with whether the counter is to read in tenths of a gallon, hundredths of a gallon, or in such other units as it may be desired to employ. For example, if desired, the mechanism can be designed for operation under the metric system of measurement. The intermittent gear train provides a relatively simple, yet extremely compact reduction mechanism.

Figure 9:
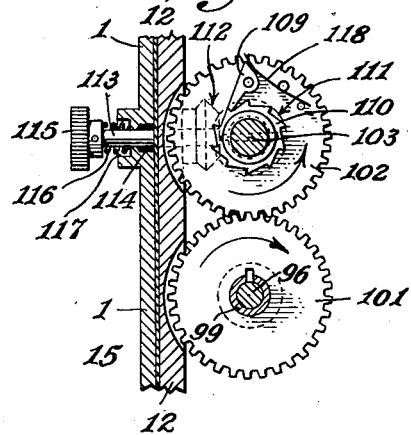
Figure 9 is a detail sectional view showing a portion of the counter mechanism and the resetting knob for the upper counter, taken as indicated at 9—9 in Fig. 5.

Referring further to Figure 5, I have shown, adjacent the tenths wheel 97, a units wheel 98 which is keyed to a sleeve 99 surrounding the shaft 96 and mounted for rotation with respect thereto. The sleeve 99 extends through to the opposite end of the counter case 10 and projects through a bearing 100 in the end wall thereof. Keyed to the sleeve 99 outside of the case 10 is a gear 101 which meshes with a gear 102. The gear 102 transmits its motion to a shaft 103 of a gauge for indicating the amount of gasoline in the tank, by a pawl 109 (Figure 9) which engages a ratchet wheel 110 keyed to the shaft 103. The units wheel 104 of this gauge is keyed directly to the shaft 103 so that registration of a gallon on the lower counter is likewise registered on this gauge. The tens, hundreds and thousands wheels 105, 106 and 107 of the lower counter may be actuated from the units wheel 98 by usual carrying means (not shown) which do not form a part of the present invention and which means are well known in the art. By this means the tens wheel moves one-tenth of a revolution for each complete revolution of the units wheel 98, the hundreds wheel moves one-tenth of a revolution for each complete revolution of the tens wheel, and so on. Similarly, the tens wheel 108 of the upper gauge makes one-tenth of a revolution for each complete revolution of the units wheel 104 of this gauge.

If desired, the upper gauge may be provided with a tenths wheel. In this case the gear 101 would be keyed directly to the shaft 96 instead of to the sleeve 99. It will be observed that in either case the upper gauge runs in the opposite direction from the lower counter, so that the numerals seen through the window 18 will always show the total gallons consumed, which will be an increasing amount, whereas the numerals showing through the upper window 17 will show the gallons remaining in the tank, which will be a decreasing amount.

*The gauge resetting mechanism*

Secured at the end of the shaft 103 of the upper gauge is a bevel gear 111. A second bevel gear 112 which is normally out of engagement with the gear 111 is keyed to the shaft 113 which extends through the attaching plate 12 of the counter case 10 and through a stuffing box 114 associated with the front of the main casing 1. A resetting knob 115 is fastened to the end of the shaft 113 where it projects outside of the instrument. The shaft 113 is mounted so as to be shiftable along its axis, and a coil spring 116 may be arranged around the shaft, bearing at one end against the knob 115 and at the other end against the base of a pocket 117 formed in the outside of the case 1. This spring normally holds the gear 112 out of engagement with the gear 111. However, when gasoline is added to the main tank of the vehicle, the resetting knob 115 is pushed in to bring the gears 111 and 112 in engagement and the knob then turned to reset the gauge to a figure which is obtained by adding the amount of additional fuel to the previous reading of the gauge. It will be observed that during this resetting operation the reading of the lower counter is not disturbed, the shaft 103 merely being turned without turning the gear 102, this action being permitted by the pawl and ratchet mechanism 109, 110. A spring 118 may be provided to insure engagement of the pawl with the teeth of the ratchet.

In assembling the instrument the cylinders 2 and 3 and the valve and counter mechanisms are first mounted on the base plate 5, the instrument being calibrated and all adjustments made to insure proper operation. The instrument is calibrated by adjusting the screw 22 in each of the pistons 19 so as to give accurate readings. This adjustment insures that the valve will be tripped at the instant that each measuring cylinder has received the correct amount of fuel in the embodiment described when it has received 0.231 cubic inch of gasoline. The complete operating unit is then inserted in the case 1 and the gasket 15 and the screws 16 put in place. This locates the instrument within the case so that the inlet connection 33 can be inserted through the opening 32 into the base of the accumulator cylinder 3. As previously explained, the clearance at 35 allows for such variation as may occur through the tightening of the attaching plate 12 against the gasket 15 at the forward end of the case. The outlet 34 communicates with the inside of the case proper, as clearly shown in Figure 3. The inlet and outlet openings are sealed by gaskets 119 which are pressed between the outside of the case 1 and metal washers 120 by means of the nuts 121. The cover 36 is next applied, and preferably is sealed permanently against unauthorized tampering by soldering or brazing it to the casing 1, as at 122.

The instrument is now complete and ready for installation. It is designed for mounting behind the instrument panel of the vehicle, and for this purpose the casing 1 may be provided with a pair of attaching lugs 123 which are so disposed as to permit the front of the instrument to be brought together against, or project slightly through, an opening 124 in the panel where it is secured in place in any convenient manner, as by the screws 125. The inlet 33 now is connected to a tube 126 leading from the fuel pump or vacuum tank of the car, as by means of a nipple 127, and the outlet 34 is connected to a tube 128 leading to the carburetor, as by means of the nipple 129. Thus, the instrument is cut into the fuel line between the pump (or vacuum tank) and the carburetor, and so registers the quantity of gasoline or other fuel passing into the carburetor from the main tank. This indication is expressed both in terms of total volumetric consumption and in terms of volume remaining in the tank. If desired, the instrument can be mounted under the hood, but I prefer that it be mounted in the manner previously described.

It is believed that the operation of my combined meter and gauge will be understood from the description of the operation of the various units thereof which has preceded. However, the complete operation may be summarized briefly as follows:

Let us assume that the instrument is being installed in a new automobile as it comes off the end of the assembly line and that the gasoline tank is empty. The counter will read 0000.0, this being the setting of the instrument as installed. Now we shall assume that 10 gallons of gasoline are put in the tank. The knob 115 is pushed in and turned until the upper gauge reads "10." Now the instrument is ready to be put into operation. When the car is running the fuel pump forces gasoline into the accumulator 3, thence through the conduit 44 into one of the measuring cylinders 2. When this cylinder has been filled, the extension 29 of its lever 25 trips the corresponding lever 72, permitting the valve plate 55 to snap over into its other position under the action of the spring 69 which has been tensioned by movement of the rocking disc 63 under the action of the lever 25. At this moment, the other measuring cylinder begins to fill and the first one to discharge into the main part of the casing 1. From this point the gasoline flows through the outlet 34 and tube 128 to the carburetor. At the same time that the levers 25 of the measuring cylinders are thus controlling the action of the valve mechanism, they also serve to impart intermittent rotation of the shaft 64 through the ratchet wheel 81. This operates the counter and gauge through the intermittent gear train in the manner which has been described, registering gasoline consumption and indicating the amount of gasoline remaining in the tank. It will be understood, of course, that the initial setting of the gauge which shows the number of gallons remaining in the tank must be such as to compensate for the fuel required to initially fill all of the connecting lines and chambers between the tank and the mixing chamber of the carburetor. This initial adjustment once having been made, and assuming that there are no leaks in the system, the gauge will always show the exact amount of fuel remaining in the tank to the nearest gallon or tenth of a gallon in accordance with the calibration of the instrument. Also, the main counter will indicate the total gallons which have been consumed at any particular time, and a simple arithmetical calculation based on this figure and on the mileage reading of the speedometer will show the average number of miles which the car has run per gallon of fuel consumed.

One of the advantages of my instrument resides in its accuracy. It is much more accurate than any of the usual types of electric or liquid column types of tank gauges. Another advantage is that it combines in a single instrument suitable for mounting on the instrument panel, a tank gauge and a meter showing total consumption of fuel. A further advantage resides in the fact that the instrument does not have any rapidly rotating parts as is the case with meters employing rotating metering wheels. This decreases the amount of wear and increases the accuracy of the reading. My device is particularly suitable for use in conjunction with the usual fuel pump for automobiles which, as is well known, creates a pulsating flow in the line leading to the carburetor. I have found, however, that an instrument operating on the principles disclosed herein gives extremely accurate readings even under these conditions of pulsating flow.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A fuel indicator for automotive vehicles comprising a single liquid-tight container, a pair of measuring chambers within said container, a valve arranged to selectively connect the chambers alternately with the interior of the container and with a conduit connected to a liquid fuel source outside of the container so that one chamber is being filled while the other is discharging its measured contents into the container around the chambers, a member in each of the chambers arranged for actuation by the fuel entering and leaving the chamber, means including a lever actuated by said members, said valve having a movable element, a resilient connection between said element and said lever, movable stops arranged for intermittent engagement by the valve element, and means actuated by said members for releasing the valve element from the stop members to allow it to quickly follow the movement of said lever under the tension built up in the resilient connection during the interval of engagement of the movable valve element by the stop member.

2. A fuel indicator for automotive vehicles comprising a container, two measuring cylinders within the container and completely surrounded thereby, a selective valve, each cylinder communicating through the selective valve with the interior of the container and with a fuel source outside of the container, a piston within each cylinder, the pistons being arranged for operation solely by the pressure of the fuel within the cylinders, means including a resilient spring element for actuating the selective valve, a counter, and means for actuating the counter in accordance with the movement of the pistons.

3. A fuel indicator for automotive vehicles comprising a container, two measuring cylinders within the container, a selective valve, one end of each cylinder communicating through the selective valve with the interior of the container and with a fuel source outside of the container, the other end of each cylinder opening directly into the container, a piston within each cylinder, the pistons being arranged for operation solely by the pressure of the fuel within the cylinders, means including a resilient spring element for actuating the selective valve, a counter, and means for actuating the counter in accordance with the movement of the pistons.

GEORGE B. PEEBLES.